United States Patent
Kulkarni et al.

(10) Patent No.: US 7,454,587 B1
(45) Date of Patent: Nov. 18, 2008

(54) METHOD AND APPARATUS FOR MEMORY MANAGEMENT IN AN INTEGRATED CIRCUIT

(75) Inventors: Chidamber R. Kulkarni, Santa Clara, CA (US); Gordon J. Brebner, Los Gatos, CA (US)

(73) Assignee: XILINX, Inc., San Jose, CA (US)

( * ) Notice: Subject to any disclaimer, the term of this patent is extended or adjusted under 35 U.S.C. 154(b) by 194 days.

(21) Appl. No.: 11/348,731

(22) Filed: Feb. 6, 2006

(51) Int. Cl.
*G06F 12/06* (2006.01)
*G06F 13/14* (2006.01)

(52) U.S. Cl. .................. 711/170; 711/153
(58) Field of Classification Search ............. None
See application file for complete search history.

(56) References Cited

U.S. PATENT DOCUMENTS

2005/0168472 A1* 8/2005 Gosalia et al. ............ 345/543
2006/0041718 A1* 2/2006 Ulrich et al. ............. 711/114
2007/0033327 A1* 2/2007 Sinclair .................. 711/103

OTHER PUBLICATIONS

U.S. Appl. No. 10/769,591, Kuklkarni et al., filed Jan. 30, 2004.

* cited by examiner

*Primary Examiner*—Than Nguyen
(74) *Attorney, Agent, or Firm*—Robert M. Brush; Justin Liu (57) ABSTRACT

Method and apparatus for managing memory logic is described. In one example, user logic, virtual port logic, and a processor are provided. The user logic is configured to provide allocation requests for the memory logic, access requests for the memory logic, and de-allocation requests for the memory logic. The virtual port logic is coupled to the user logic and the memory logic. The processor is coupled to the virtual port logic. The virtual port logic is configured to forward the allocation requests and de-allocation requests to the processor, and to process the access requests. The processor is configured to allocate space in the memory logic in response to the allocation requests and de-allocate space in the memory logic in response to the de-allocation requests.

15 Claims, 8 Drawing Sheets

METHOD AND APPARATUS FOR MEMORY MANAGEMENT IN AN INTEGRATED CIRCUIT

FIELD OF THE INVENTION

One or more aspects of the present invention relate generally to memory subsystems and, more particularly, to a method and apparatus for memory management in an integrated circuit.

BACKGROUND OF THE INVENTION

Programmable logic devices (PLDs) exist as a well-known type of integrated circuit (IC) that may be programmed by a user to perform specified logic functions. There are different types of programmable logic devices, such as programmable logic arrays (PLAs) and complex programmable logic devices (CPLDs). One type of programmable logic device, known as a field programmable gate array (FPGA), is very popular because of a superior combination of capacity, flexibility, time-to-market, and cost.

An FPGA typically includes an array of configurable logic blocks (CLBs) surrounded by a ring of programmable input/output blocks (IOBs). The CLBs and IOBs are interconnected by a programmable interconnect structure. The CLBs, IOBs, and interconnect structure are typically programmed by loading a stream of configuration data (known as a bitstream) into internal configuration memory cells that define how the CLBs, IOBs, and interconnect structure are configured. An FPGA may also include various dedicated logic circuits, such as memories, microprocessors, digital clock managers (DCMs), and input/output (I/O) transceivers.

Currently, circuits are designed for configuration in PLDs using either a behavioral language, such as C, Handel-C, and the like, or a hardware description language (HDL), such as the very high speed integrated circuit hardware description language (VHDL), VERILOG, and the like. In either case, a circuit designer must explicitly specify memory architectures for the circuit design (i.e., the allocation and partitioning of data over distributed memories). A circuit designer must spend significant design time for designing and coding the particular memory architecture for the design. Accordingly, there exists a need in the art for a more flexible memory management in circuit designs for integrated circuits, for example, PLDs.

SUMMARY OF THE INVENTION

Method and apparatus for managing memory logic is described. In one embodiment, user logic, virtual port logic, and a processor are provided by an integrated circuit. The user logic is configured to provide allocation requests for the memory logic, access requests for the memory logic, and de-allocation requests for the memory logic. The virtual port logic is coupled to the user logic and the memory logic. The processor is coupled to the virtual port logic. The virtual port logic is configured to forward the allocation requests and de-allocation requests to the processor, and to process the access requests. The processor is configured to allocate space in the memory logic in response to the allocation requests and de-allocate space in the memory logic in response to the de-allocation requests.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Figure 1:
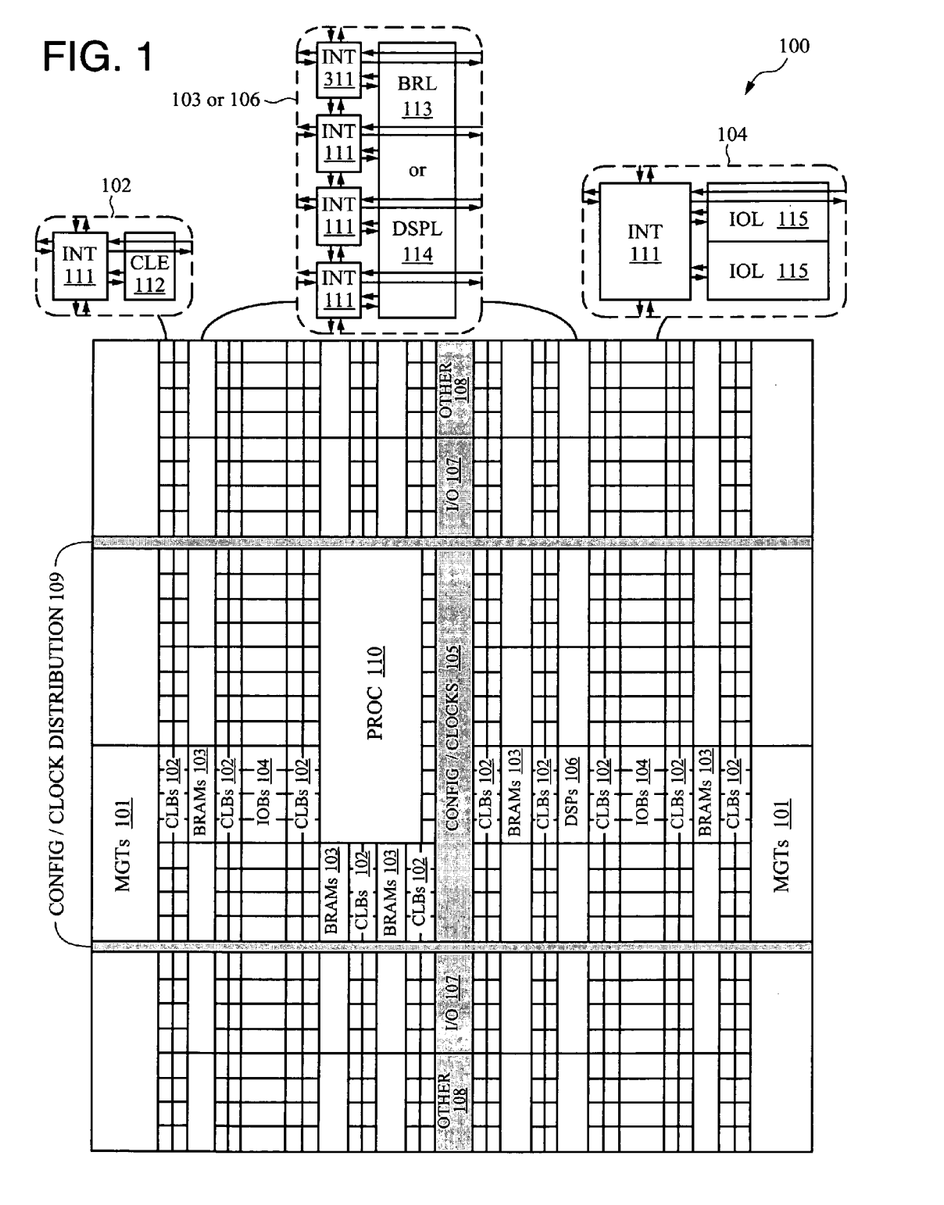
FIG. 1 is a block diagram depicting an exemplary embodiment of an FPGA architecture.

FIG. 1 illustrates an FPGA architecture 100 that includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth.

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

The FPGA architecture 100 also includes one or more dedicated processor blocks (PROC 110). The processor block 110 comprises a microprocessor core, as well as associated control logic. Notably, such a microprocessor core may include embedded hardware or embedded firmware or a combination thereof for a "hard" or "soft" microprocessor. A soft microprocessor may be implemented using the programmable logic (e.g., CLBs, IOBs). For example, a MICROBLAZE soft microprocessor, available from Xilinx of San Jose, Calif., may be employed. A hard microprocessor may be implemented using an IBM POWER PC, Intel PENTIUM, AMD ATHLON, or like type processor core known in the art. The processor block 110 is coupled to the programmable logic of the FPGA in a well known manner.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic.

Figure 2:
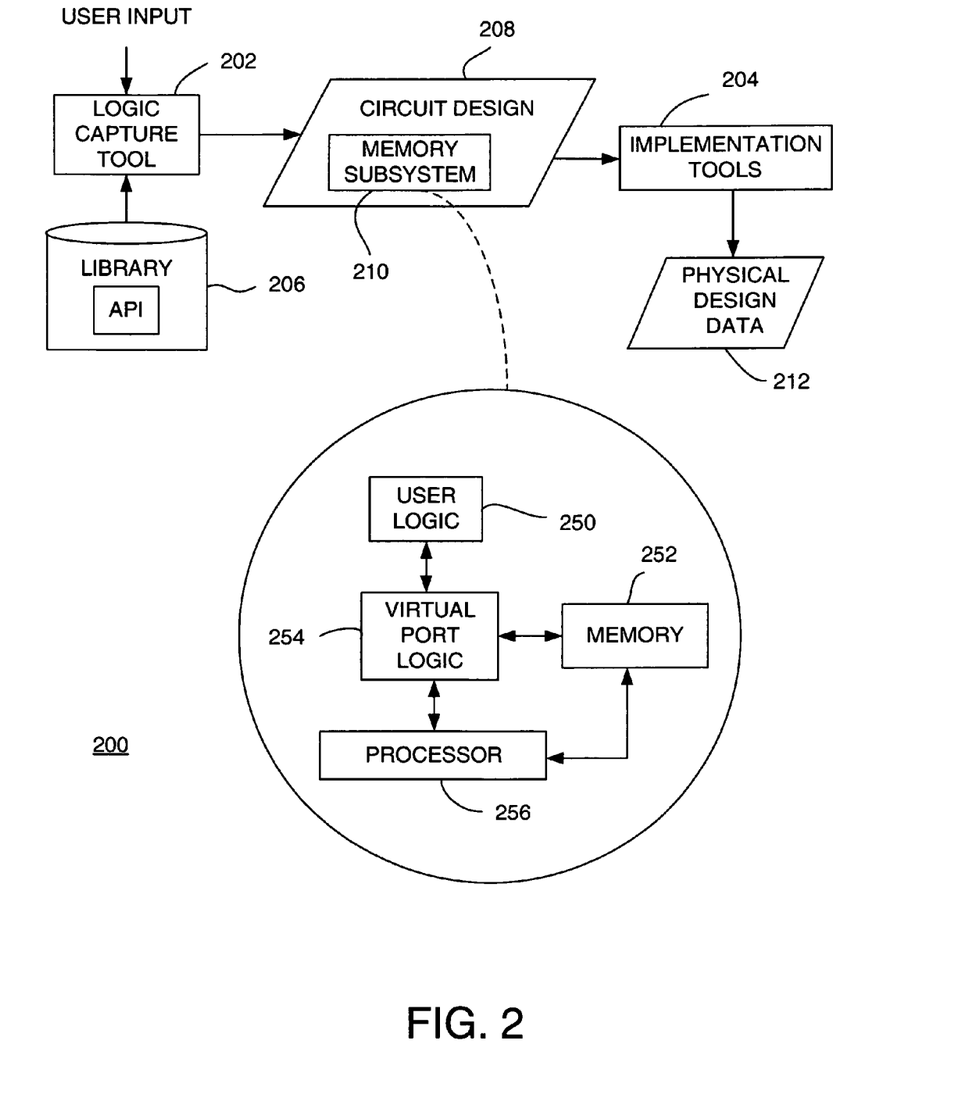
FIG. 2 is a block diagram depicting an exemplary embodiment of a circuit design system constructed in accordance with one or more aspects of the invention.

FIG. 2 is a block diagram depicting an exemplary embodiment of a circuit design system 200 constructed in accordance with one or more aspects of the invention. The system 200 includes a logic capture tool 202, a library 206, and implementation tools 204. The logic capture tool 202 is configured to capture input from a user and generate circuit design 208 for implementation in a target PLD. The circuit design 208 specifies hardware for implementation in the target PLD and/or software for execution on one or more processors embedded in the target PLD. The logic capture tool 202 may include a graphic interface through which a designer connects symbols and blocks representing various components to produce a schematic description. The logic capture tool 202 may also include a text interface through which a designer writes hardware description language (HDL) code and/or behavioral code (e.g., C) to produce a structural and/or behavioral description of the system.

The circuit designer 208 specifies a memory subsystem 210. The memory subsystem 210 includes user logic 250, memory 252, virtual port logic 254, and a processor 256. The user logic 250 is coupled to the virtual port logic 254. The virtual port logic 254 is further coupled to the processor 256 and the memory 252. The processor 256 is also configured to communicate with the memory 252. The user logic 250 is configured to generate data to be stored in the memory 252 and receive data from the memory 252 as input. For example, the user logic 250 may provide data to be stored in the memory 252 for use by software running on the processor 256. The user logic 250 may receive data from the memory 252 that has been stored by the software. That is, the memory 252 enables communication between the user logic 250 and the processor 256.

The virtual port logic 254 is a "wrapper" for the memory 252. That is, the user logic 250 does not interact with the memory 252 directly, but rather interacts with the memory 252 through the virtual port logic 254. The processor 256 is aware of the specific configuration of the address space for the memory 252 and is configured to manage memory allocations and de-allocations requested by the user logic 250. Once space is allocated, the virtual port logic 254 arbitrates access to the allocated space by the user logic 250.

In particular, to obtain space in the memory 252, the user logic 250 provides an allocation request to the virtual port logic 254. The virtual port logic 254 forwards the allocation request to the processor 256. The processor 256 allocates a block of space in the memory 252 in response to the allocation request and returns data indicative of the allocation to the virtual port logic 254. The virtual port logic 254 registers the allocation and provides a handle to such allocation to the user logic 250.

To access the allocated block of space in the memory 252, the user logic 250 provides a memory access request to the virtual port logic 254 along with the handle to the allocation. The virtual port logic 254 grants access to the memory 252 based on the allocation handle. In this manner, the user logic 250 may read data from the allocated block of space and write data to the allocated block of space.

To free the allocated space in the memory 252, the user logic 250 provides a de-allocation request to the virtual port logic 254. The virtual port logic 254 forwards the de-allocation request to the processor 256. The processor 256 de-allocates the space in the memory 252 and returns data indicative of such de-allocation to the virtual port logic 254. The virtual port logic 254 in turn un-registers the memory allocation (i.e., the handle becomes invalid).

The logic capture tool 202 is coupled to the library 206. The library 206 stores an application programming interface (API) associated with a memory model that provides dynamic memory management on PLD. The memory model is configurable and programmable via the API. Notably, the API includes a set of primitives for defining structural and behavioral attributes of the memory model. A circuit designer employs the API to specify the memory subsystem 210 of the circuit design 208. That is, the memory subsystem 210 is an instantiation of the memory model. In one embodiment, the API includes a new construct and a free construct. When designing user logic, an allocation request is implemented using the new construct. De-allocation requests are implemented using the free construct. Such a programming model is similar to dynamic memory allocation in object oriented programming languages, such as C++.

The implementation tools 204 are configured to receive the circuit design 208. The implementation tools 204 produce physical design data 212 for a target PLD from the circuit design 208. For example, for FPGAs, the implementation tools 204 may include a map tool for mapping logic of the circuit design 208 onto physical resources of the target PLD, as well as a place-and-route (PAR) tool for placing the mapped design within the target PLD and routing connections. Such map and PAR tools are well known in the art. It is to be understood that the implementation tools 204 may include other well known tools for other types of PLDs.

Figure 3:
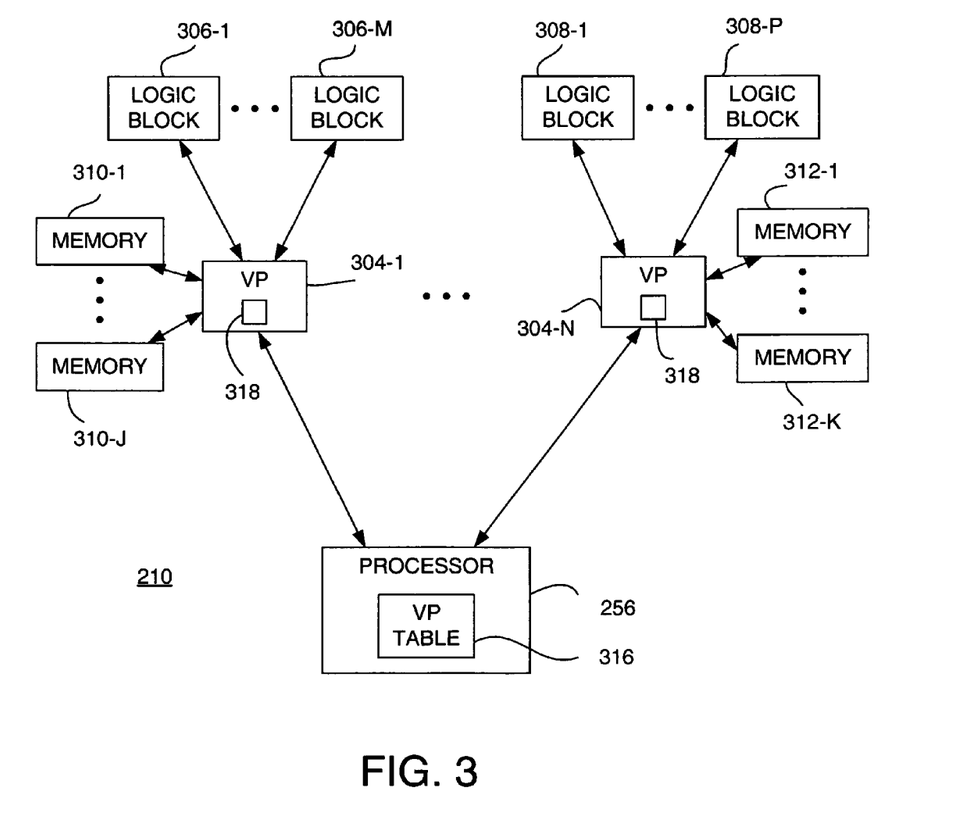
FIG. 3 is a block diagram depicting another exemplary embodiment of the memory subsystem of FIG. 2 constructed in accordance with one or more aspects of the invention.

FIG. 3 is a block diagram depicting another exemplary embodiment of the memory subsystem 210 constructed in accordance with one or more aspects of the invention. The memory subsystem 210 may be implemented on an integrated circuit (IC). In one embodiment the IC includes programmable logic and programmable interconnections. In another embodiment the IC is a PLD, such as an FPGA. In the present embodiment, the memory subsystem 210 includes the processor 256 and virtual ports 304-1 through 304-N (collectively referred to as virtual ports 304), where N is an integer greater than zero. Each of the virtual ports 304 is coupled to one or more memories. For example, the virtual port 304-1 is coupled to memories 310-1 through 310-J (collectively referred to as memories 310), where J is an integer greater than zero. The virtual port 304-N is coupled to memories 312-1 through 312-K (collectively referred to as memories 310), where K is an integer greater than one. Each of the virtual ports 304 is also coupled to one or more logic blocks. For example, the virtual port 304-1 is coupled to logic blocks 306-1 through 306-M (collectively referred to as logic blocks 306), where M is an integer greater than zero. The virtual port 304-N is coupled to logic blocks 308-1 through 308-P (collectively referred to as logic blocks 308), where P is an integer greater than one. Each of the virtual ports 304 is also coupled to the processor 256. For purposes of clarity by example, virtual ports 304-2 through 304-N-1 have been omitted along with the memories and the logic blocks coupled thereto. In addition, connections between the processor 256 and the memories 310 and 312 have been omitted.

The logic block(s) coupled to each of the virtual ports 304 comprise user-defined logic, for example, using programmable logic of an FPGA. The memory or memories coupled to each of the virtual ports 304 may comprise random access memory (RAM), such as BRAM in the FPGA. The processor 256 may comprise an embedded processor in the FPGA, such as a PowerPC processor or MICROBLAZE processor. With reference to FIG. 2, the logic blocks (e.g., logic blocks 306 and 308) comprise the user logic 250, the memories (e.g., memories 310 and 312) comprise the memory 252, and the virtual ports 304 comprise the virtual port logic 254. Each of the logic blocks may request memory allocation, request memory access, and request memory de-allocation, as described above for the user logic 250.

Notably, the processor 256 includes a table of virtual ports ("virtual port table 316"). The virtual port table 316 includes information indicative of which memories are coupled to which virtual ports 304. When the processor 256 receives an allocation request from a given virtual port, the processor 256 allocates space in a memory that is coupled to that virtual port based on information in the virtual port table 316. In one embodiment, the memory or memories coupled to a given virtual port have a particular base address in the collective address space. In other words, each of the virtual ports 304 is associated with a base address ("virtual port base address"). When the processor 256 receives an allocation request from a given virtual port, the processor 256 allocates space in accordance with the virtual port base address for the virtual port.

Figure 5:
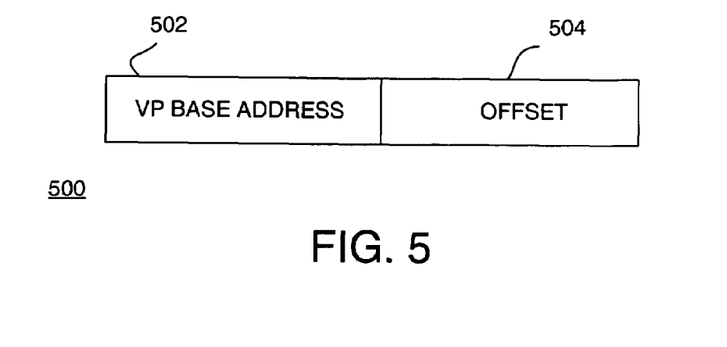
FIG. 5 is a block diagram depicting an exemplary embodiment of an addressing scheme for the memory subsystem of FIG. 3.

FIG. 5 is a block diagram depicting an exemplary embodiment of an addressing scheme 500 for the memory subsystem 210 of FIG. 3. The addressing scheme 500 includes a virtual port (VP) base address 502 and an offset 504. The logic blocks and the processor 256 address the memories using the addressing scheme 500.

Returning to FIG. 3, each of the virtual ports 304 includes a table of memory allocations ("allocation table 318"). The allocation table 318 includes information indicative of associations between memory allocations and logic blocks. Each of the virtual ports 304 provides a handle for each memory allocation. The allocation table 318 may include a mapping between handles and logic blocks. In one embodiment, each handle includes a base address in a particular memory to which space was allocated by the processor 256. In the present embodiment, a logic block can only access those memories that are coupled its virtual port.

Figure 4:
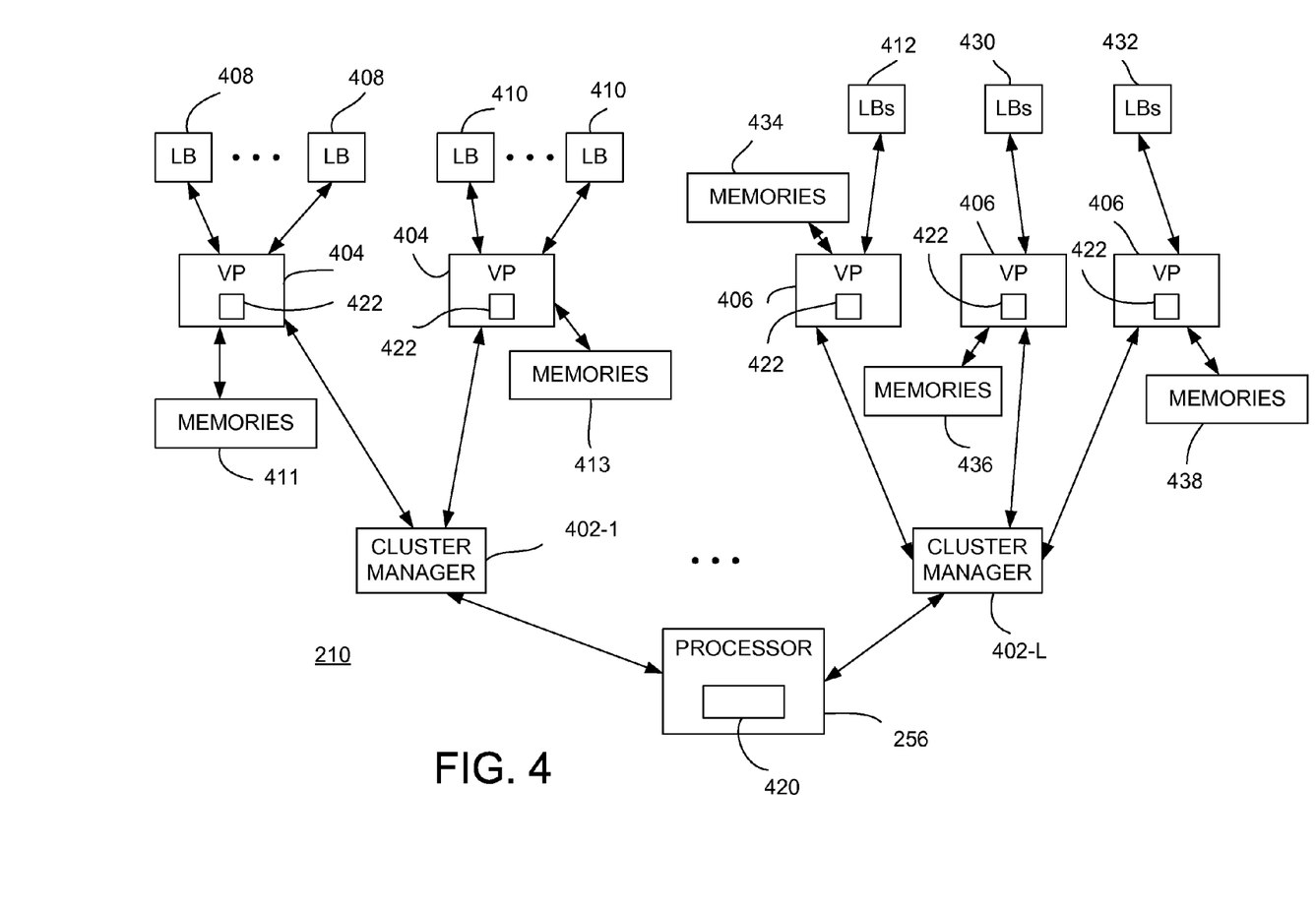
FIG. 4 is a block diagram depicting yet another exemplary embodiment of the memory subsystem of FIG. 2 constructed in accordance with one or more aspects of the invention.

FIG. 4 is a block diagram depicting yet another exemplary embodiment of the memory subsystem 210 constructed in accordance with one or more aspects of the invention. In the present embodiment, the memory subsystem 210 includes the processor 256 and cluster managers 402-1 through 402-L (collectively referred to as cluster managers 402), where L is an integer greater than zero. Each of the cluster managers 402 is coupled to one or more virtual ports, as well as the processor 256. Each of the virtual ports is coupled to one or more memories, one or more logic blocks, and the processor 256. For example, the cluster manager 402-1 is shown as being coupled to virtual ports 404 (e.g., two are shown), and the cluster manager 402-L is shown as being coupled to virtual ports 406 (e.g., three are shown). The virtual ports 404 are shown coupled to logic blocks 408 and logic blocks 410, and memories 411 and 413. The virtual ports 406 are shown coupled to logic blocks 412, 430, and 432, as well as memories 434, 436, and 438. The number of virtual ports, memories, and logic blocks shown in FIG. 4 is merely illustrative. For purposes of clarity by example, cluster managers 402-2 through 402-L-1 have been omitted along with the virtual ports, memories, and the logic blocks coupled thereto.

The logic block(s) coupled to each of the virtual ports comprise user-defined logic, for example, using programmable logic of an FPGA. The memory or memories coupled to each of the virtual ports may comprise random access memory (RAM), such as BRAM in the FPGA. The processor 256 may comprise an embedded processor in the FPGA, such as a PowerPC processor or MICROBLAZE processor. With reference to FIG. 2, the logic blocks (e.g., logic blocks 408, 410, 412, 430, and 432) comprise the user logic 250, the memories (e.g., memories 411, 413, 434, 436, and 438) comprise the memory 252, and the virtual ports (e.g., 404 and 406) and the cluster managers 402 comprise the virtual port logic 254.

In the present embodiment, a hierarchical memory access scheme is provided. That is, a logic block requests memory allocations, memory access, and memory de-allocations from its respective virtual port, as described above. The virtual port forwards allocation and de-allocation requests to its cluster manager, rather than to the processor 256 directly. The cluster manger in turn forwards the allocation and de-allocation requests to the processor 256. A logic block requests access to allocated memory (e.g., read or write) from its virtual port. The virtual port may access memories coupled thereto, as well as memories coupled to other virtual port(s) through the cluster manager.

Notably, the processor 256 includes a table of cluster managers ("cluster manager table 420"). The cluster manager table 420 includes information indicative of which virtual ports a given cluster manager manages, along with which memories a given virtual port manages. When the processor 256 receives an allocation request from a given cluster manager, the processor 256 allocates space in a memory that is managed by that cluster manager based on information in the cluster manager table 420. In one embodiment, the memory or memories managed by a given cluster manager have a particular cluster address in the collective address space. In other words, each of the cluster managers 402 is associated with a cluster address. When the processor 256 receives an allocation request from a given cluster manager, the processor 256 allocates space in accordance with the cluster address for the cluster manager and a virtual port base address for a virtual port coupled to the cluster manager. The processor 256 may allocate space using a virtual port base address for a virtual port that is not coupled to the requesting user logic, but is controlled by the cluster manager.

Figure 6:
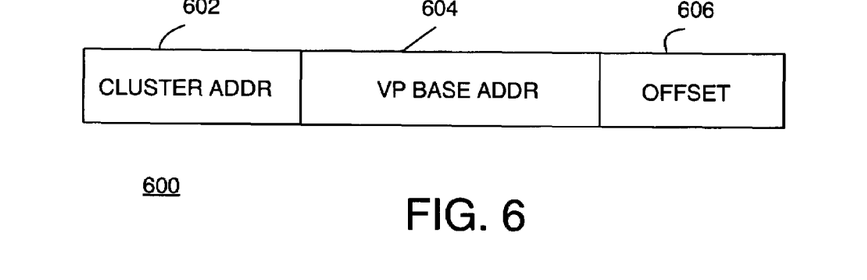
FIG. 6 is a block diagram depicting an exemplary embodiment of an addressing scheme for the memory subsystem of FIG. 4.

FIG. 6 is a block diagram depicting an exemplary embodiment of an addressing scheme 600 for the memory subsystem 210 of FIG. 4. The addressing scheme 600 includes a cluster address 602, a virtual port (VP) base address 604, and an offset 606. The logic blocks and the processor 256 address the memories using the addressing scheme 600.

Returning to FIG. 4, each of the virtual ports 304 includes a table of memory allocations ("allocation table 422"). The allocation table 422 includes information indicative of associations between memory allocations and logic blocks. Each of the virtual ports provides a handle for each memory allocation. The allocation table 422 may include a mapping between handles and logic blocks. In one embodiment, each handle includes a cluster address and a virtual port base address in which space was allocated by the processor 256. In response to an access request, a given virtual port processes the handle to determine if the access request should be forwarded to the cluster manager. If the handle is associated with a memory coupled directly to the virtual port, the virtual port processes the access request. Otherwise, the virtual port forwards the access request to the cluster manager. The cluster manager then processes the handle to determine which of the other virtual ports the request should be forwarded. The cluster manager then forwards the access request to the appropriate virtual port, which processes the access request.

Figure 7:
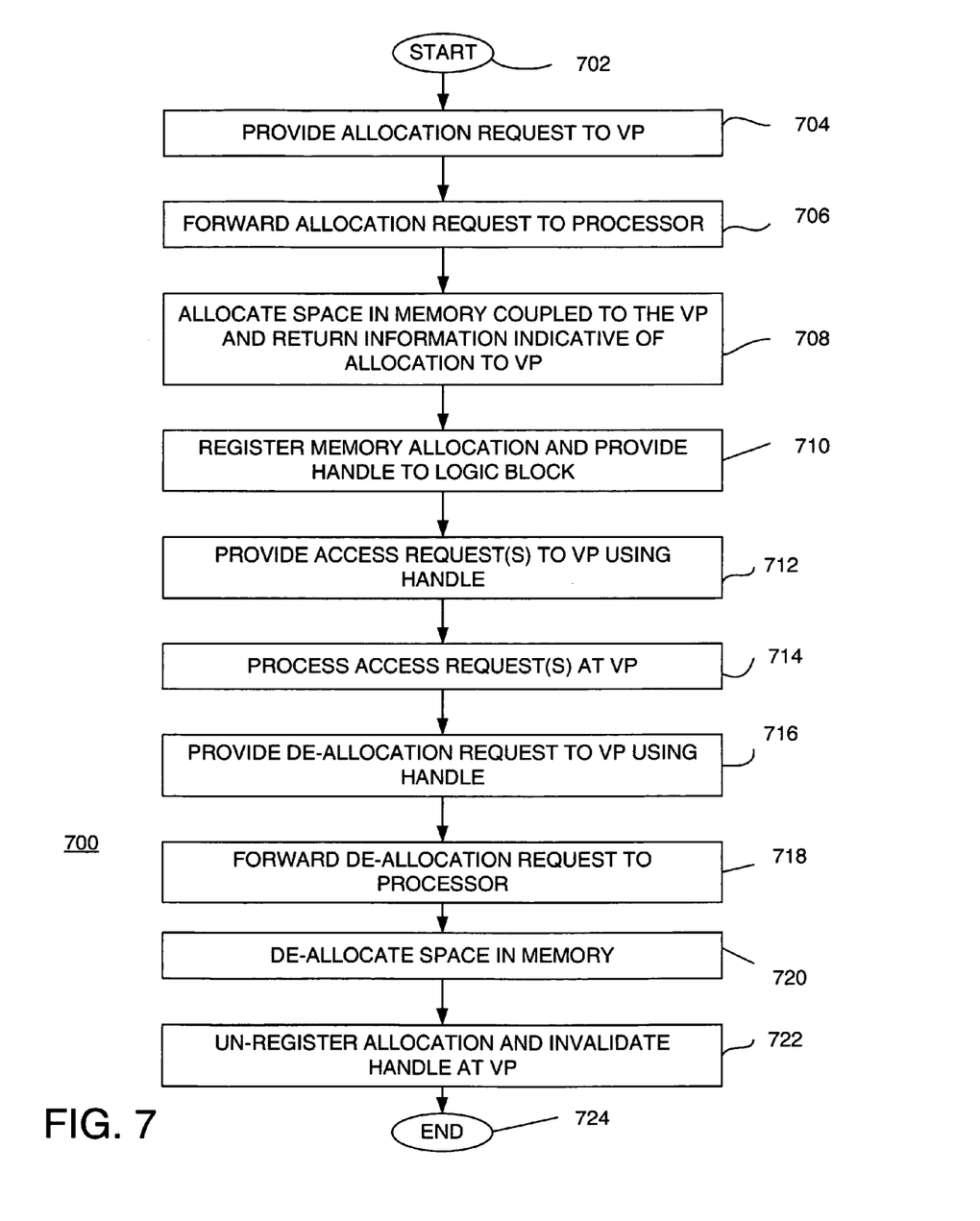
FIG. 7 is a flow diagram depicting an exemplary embodiment of method for allocation, access, and de-allocation of memory in accordance with one or more aspects of the invention.

FIG. 7 is a flow diagram depicting an exemplary embodiment of method 700 for allocation, access, and de-allocation of memory in accordance with one or more aspects of the invention. The method 700 begins at step 702. At step 704, a logic block provides an allocation request to a virtual port (VP). At step 706, the virtual port forwards the allocation request to a processor. At step 708, the processor allocates space in a memory coupled to the virtual port and returns information indicative of the memory allocation to the virtual port. At step 710, the virtual port registers the memory allocation and provides an associated handle to the logic block. At step 712, the logic block provides one or more access requests to the virtual port using the handle. At step 714, the virtual port processes the one or more access requests based on the handle. At step 716, the logic block provides a de-allocation request to the virtual port using the handle. At step 718, the virtual port forwards the de-allocation request to the processor. At step 720, the processor de-allocates the space in the memory. At step 722, the virtual port un-registers the memory allocation and invalidates the handle. The method 700 ends at step 724.

Figure 8:
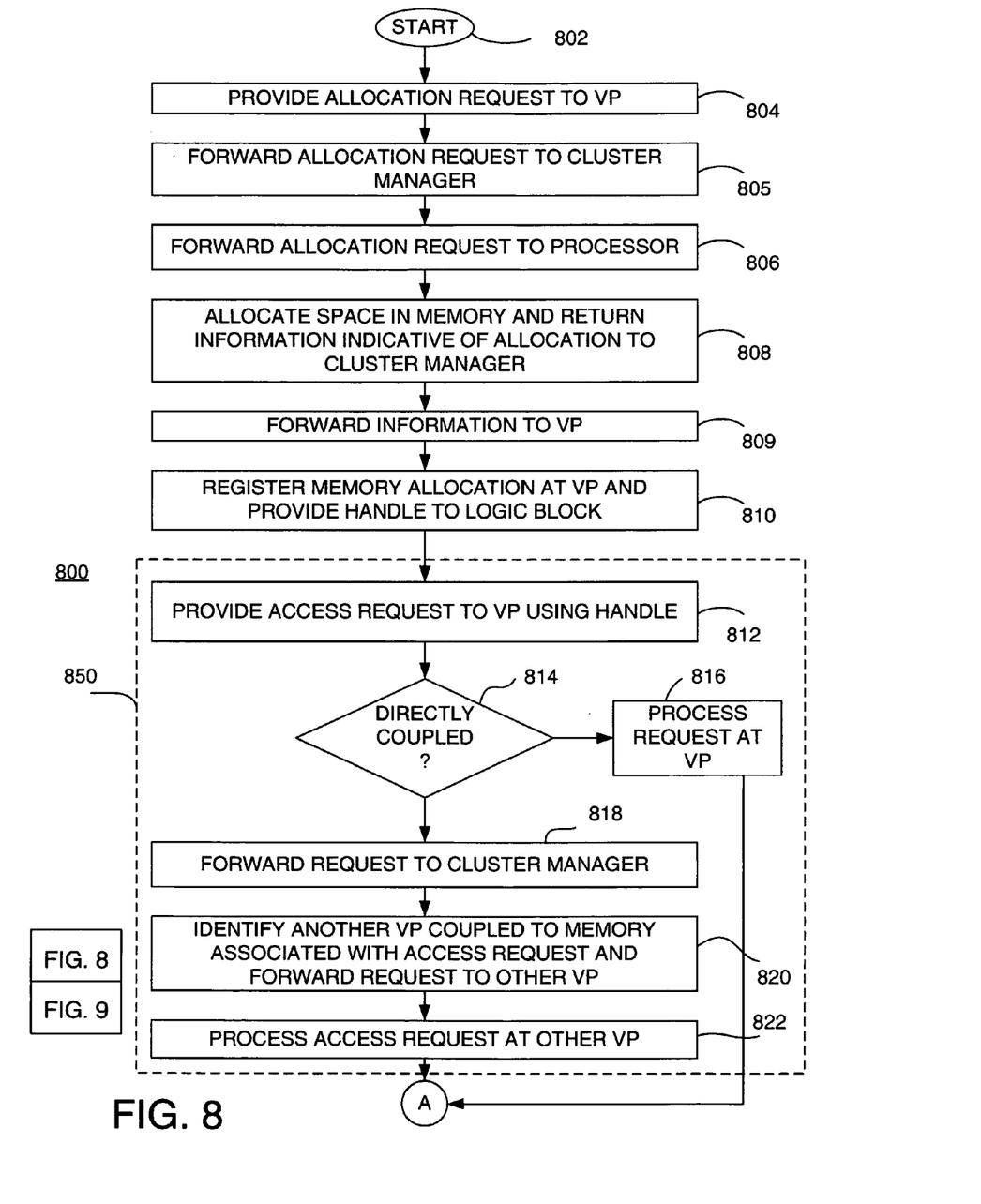
FIGS. 8 and 9 show a flow diagram depicting another exemplary embodiment of method for allocation, access, and de-allocation of memory in accordance with one or more aspects of the invention.
Figure 9:
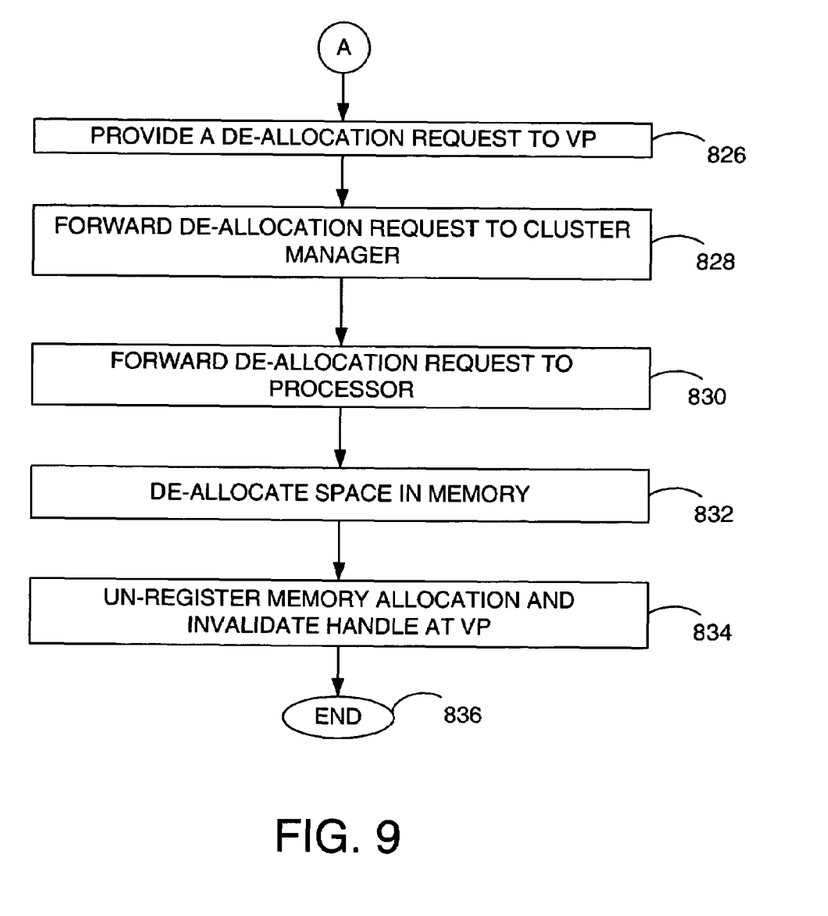

FIGS. 8 and 9 show a flow diagram depicting another exemplary embodiment of method 800 for allocation, access, and de-allocation of memory in accordance with one or more aspects of the invention. The method 800 begins at step 802. At step 804, a logic block provides an allocation request to a virtual port. At step 805, the virtual port forwards the allocation request to a cluster manager. At step 806, the cluster manager forwards the allocation request to a processor. At step 808, the processor allocates space in a memory managed by the cluster manager and returns information indicative of the memory allocation to the cluster manager. At step 809, the cluster manager forwards the information indicative of the memory allocation to the virtual port. At step 810, the virtual port registers the memory allocation and provides an associated handle to the logic block.

At step 812, the logic block provides an access request to the virtual port using the handle. At step 814, a determination is made whether the access request is for a memory directly coupled to the virtual port. If so, the method 800 proceeds to step 816, where the virtual port processes the request. Otherwise, the method 800 proceeds to step 818, where the virtual port forwards the access request to the cluster manager. At step 820, the cluster manager identifies another virtual port coupled to the memory associated with the access request and forwards the access request to the other virtual port. At step 822, the other virtual port processes the access request. Steps 812 through 822 comprise access process 850. Access process 850 may be repeated for each access request by the logic block.

At step 826, the logic block provides a de-allocation request to the virtual port using the handle. At step 828, the virtual port forwards the de-allocation request to the cluster manager. At step 830, the cluster manager forwards the de-allocation request to the processor. At step 832, the processor de-allocates the space in the memory. At step 834, the virtual port un-registers the memory allocation and invalidates the handle. The method 800 ends at step 836.

Figure 10:
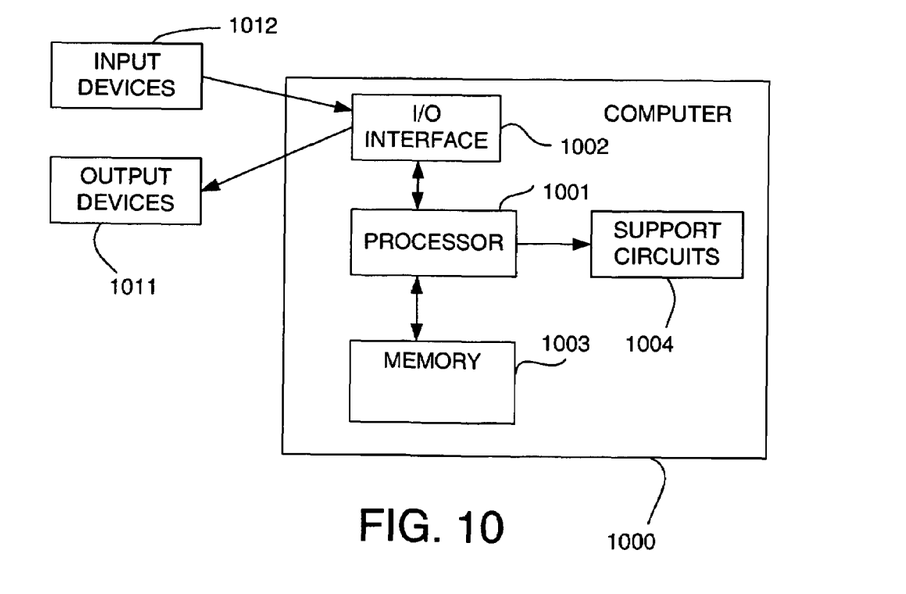
FIG. 10 is a block diagram depicting an exemplary embodiment of a computer suitable for implementing the processes and methods described herein.

FIG. 10 is a block diagram depicting an exemplary embodiment of a computer 1000 suitable for implementing the processes and methods described herein. For example, the computer 1000 may be used to implement the system 200 of FIG. 2. The computer 1000 includes a processor 1001, a memory 1003, various support circuits 1004, and an I/O interface 1002. The processor 1001 may be any type of microprocessor known in the art. The support circuits 1004 for the processor 1001 include conventional cache, power supplies, clock circuits, data registers, I/O interfaces, and the like. The I/O interface 1002 may be directly coupled to the memory 1003 or coupled through the processor 1001. The I/O interface 1002 may be coupled to various input devices 1012 and output devices 1011, such as a conventional keyboard, mouse, printer, display, and the like.

The memory 1003 stores all or portions of one or more programs and/or data to implement the system 200 described herein. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 1000 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 1203. The memory 1003 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

We claim:

1. An integrated circuit for managing memory logic, comprising:
    user logic for providing allocation requests for the memory logic, access requests for the memory logic, and de-allocation requests for the memory logic;
    virtual port logic coupled to the user logic and the memory logic; and
    a processor coupled to the virtual port logic;
    wherein the virtual port logic is configured to forward the allocation requests and de-allocation requests to the processor, and to process the access requests; and
    wherein the processor is configured to allocate space in the memory logic in response to the allocation requests and de-allocate space in the memory logic in response to the de-allocation requests;
    wherein the memory logic includes a plurality of memories, wherein the user logic includes a plurality of logic blocks, and wherein the virtual port logic includes a plurality of cluster managers and a plurality of virtual ports, each of the plurality of cluster managers being coupled to at least one of the plurality of virtual ports, each of the plurality of virtual ports begin coupled to at least one memory of the plurality of memories and at least one logic block of the plurality of logic blocks.

2. The integrated circuit of claim 1, wherein the memory logic includes a plurality of memories, wherein the user logic includes a plurality of logic blocks, and wherein the virtual port logic includes a plurality of virtual ports, each of the plurality of virtual ports being coupled to at least one memory of the plurality of memories and at least one logic block of the plurality of logic blocks.

3. The integrated circuit of claim 2, wherein the processor includes a virtual port table having associations between the plurality of virtual ports and the plurality of memories.

4. The integrated circuit of claim 3, wherein each of the virtual ports is configured to store a table having associations between memory allocations and the plurality of logic blocks.

5. The integrated circuit of claim 4, wherein the processor is configured to allocate space in the memory logic using a base address and an offset.

6. The integrated circuit of claim 4, wherein the processor is configured to allocate space in the memory logic using a cluster address, a base address, and an offset.

7. The integrated circuit of claim 1, wherein the processor includes cluster manager table having associations between the plurality of cluster managers and the plurality of memories.

8. The integrated circuit of claim 1, wherein each of the virtual ports is configured to store a table having associations between memory allocations and the plurality of logic blocks.

9. The integrated circuit of claim 1, wherein the integrated circuit comprises a programmable logic device (PLD), and wherein the user logic and the virtual port logic is implemented using programmable logic of the PLD.

10. A method of managing memory logic, comprising:
    providing an allocation request from a logic block to a virtual port;
    forwarding the allocation request from the virtual port to a cluster manager;
    forwarding the allocation request from the cluster manager to a processor;
    allocating space in the memory logic in response to the allocation request;
    returning information indicative of the allocated space to the cluster manager;
    providing the information to the virtual port;
    associating the allocated space with a handle;
    providing the handle from the virtual port to the logic block;
    providing an access request from the logic block to the virtual port using the handle;
    processing the access request at the virtual port if the allocated space is in a memory of the memory logic coupled to the virtual port; and
    forwarding the access request to the cluster manager if the allocated space is in a memory of the memory logic coupled to another virtual port coupled to the cluster manager.

11. The method of claim 10, wherein the allocated space is associated with a base address and an offset.

12. The method of claim 11, wherein the handle includes the base address.

13. The method of claim 10, further comprising, if the allocated space is in a memory of the memory logic coupled to another virtual port coupled to the cluster manager:
    forwarding the access request to the other virtual port; and
    processing the access request at the other virtual port.

14. The method of claim 10, further comprising:
    providing a de-allocation request from the logic block to the virtual port;
    forwarding the de-allocation request from the virtual port to the cluster manager;
    forwarding the de-allocation request from the cluster manager to the processor;
    de-allocating the allocated space in response to the de-allocation request; and
    invalidating the handle at the virtual port.

15. The method of claim 10, wherein the allocated space is associated with a cluster address, a base address, and an offset.

* * * * *